US012583614B2

(12) United States Patent　　　　(10) Patent No.:　US 12,583,614 B2
Bartosz　　　　　　　　　　　　　　(45) Date of Patent:　　Mar. 24, 2026

(54) ENVIRONMENTAL CONTROL SYSTEM WITH LIQUID HYDROGEN FUEL VAPORIZATION FOR A HYDROGEN FUEL CELL

(71) Applicant: Hamilton Sundstrand Corporation, Charlotte, NC (US)

(72) Inventor: Lance R. Bartosz, Granby, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 402 days.

(21) Appl. No.: 18/217,004

(22) Filed: Jun. 30, 2023

(65) Prior Publication Data

US 2025/0002170 A1　　Jan. 2, 2025

(51) Int. Cl.
　　*B64D 37/34*　　　　(2006.01)
　　*B64D 13/02*　　　　(2006.01)
　　　　　　(Continued)

(52) U.S. Cl.
　　CPC ............. *B64D 37/34* (2013.01); *B64D 13/02* (2013.01); *B64D 13/08* (2013.01); *B64D 37/30* (2013.01);
　　　　　　(Continued)

(58) Field of Classification Search
　　CPC ........ B64D 13/02; B64D 13/06; B64D 13/08; B64D 37/30; B64D 37/34;
　　　　　　(Continued)

(56) References Cited

U.S. PATENT DOCUMENTS 2,618,470 A　　11/1952　Brown et al.
2,767,561 A　　10/1956　Seeger
　　　　　　(Continued)

FOREIGN PATENT DOCUMENTS

CN　　　108425752 A　　8/2018
EP　　　　1806288 A2　　7/2007
　　　　　　(Continued)

OTHER PUBLICATIONS

Extended European Search Report for EP Application No. 24185794.5, dated Oct. 18, 2024, 11 pages.

(Continued)

*Primary Examiner* — Steven S Anderson, II
(74) *Attorney, Agent, or Firm* — Kinney & Lange, P.A.

(57)　　　　　ABSTRACT

An aircraft environmental control system includes a tank holding cryogenic fuel, a heat exchanger, a first rotary machine, a first outlet duct, and a second outlet duct. The heat exchanger includes a cold side flow path downstream from the tank to evaporate the fuel, a first hot side flow path, and a second hot side flow path. The first rotary machine includes a first compressor section with an impeller upstream from the second hot side flow path. The first rotary machine includes a first shaft tied to the impeller and a first motor to rotate the impeller. The first duct and the second duct are downstream from the heat exchanger. The first duct provides a first portion of vaporized fuel to a power generator. The second duct provides a second portion of vaporized fuel to a burner that creates hot air to move through the first hot side flow path.

20 Claims, 1 Drawing Sheet

(51) Int. Cl.
  *B64D 13/06* (2006.01)
  *B64D 13/08* (2006.01)
  *B64D 37/30* (2006.01)

(52) U.S. Cl.
  CPC ............... *B64D 2013/0648* (2013.01); *B64D 2013/0659* (2013.01)

(58) Field of Classification Search
  CPC .... B64D 2013/0618; B64D 2013/0644; B64D 2013/0674
  See application file for complete search history.

(56)                   References Cited

U.S. PATENT DOCUMENTS

| | | | |
|---|---|---|---|
| 3,158,197 A | * | 11/1964 | Blezard ............... B64D 13/006 |
| | | | 165/104.31 |
| 4,295,518 A | | 10/1981 | Rannenberg |
| 4,374,469 A | | 2/1983 | Rannenberg |
| 4,419,926 A | | 12/1983 | Cronin et al. |
| 4,493,195 A | | 1/1985 | Zalesak et al. |
| 4,505,124 A | | 3/1985 | Mayer |
| 4,829,775 A | | 5/1989 | Defrancesco |
| 5,025,642 A | | 6/1991 | Brunskill et al. |
| 5,086,622 A | * | 2/1992 | Warner ................. B64D 13/06 |
| | | | 62/88 |
| 5,214,935 A | | 6/1993 | Brunskill |
| 5,414,992 A | | 5/1995 | Glickstein |
| 5,461,882 A | | 10/1995 | Zywiak |
| 5,490,645 A | | 2/1996 | Woodhouse |
| 5,701,755 A | | 12/1997 | Severson et al. |
| 5,704,218 A | | 1/1998 | Christians et al. |
| 5,899,085 A | | 5/1999 | Williams |
| 5,967,461 A | | 10/1999 | Farrington |
| 6,182,435 B1 | | 2/2001 | Niggemann et al. |
| 6,913,636 B2 | | 7/2005 | Defrancesco et al. |
| 7,302,804 B2 | | 12/2007 | Murry et al. |
| 9,470,218 B2 | | 10/2016 | Eowsakul |
| 9,669,936 B1 | | 6/2017 | Fiterman et al. |
| 9,724,979 B1 | | 8/2017 | Thumati et al. |
| 10,202,197 B2 | | 2/2019 | Bammann et al. |
| 10,207,809 B2 | | 2/2019 | Koerner et al. |
| 10,295,284 B2 | | 5/2019 | Hanov et al. |
| 10,526,092 B2 | | 1/2020 | Defrancesco |
| 10,773,817 B1 | | 9/2020 | Brennen et al. |
| 11,174,031 B2 | | 11/2021 | Ho et al. |
| 11,286,857 B2 | | 3/2022 | Bartosz et al. |
| 11,440,674 B2 | | 9/2022 | Hiller |
| 11,511,872 B2 | | 11/2022 | Staubach et al. |
| 11,542,017 B2 | | 1/2023 | Bammann et al. |
| 11,628,939 B2 | | 4/2023 | Coutin et al. |
| 2002/0121103 A1 | | 9/2002 | Udobot et al. |
| 2003/0051492 A1 | | 3/2003 | Hartenstein et al. |
| 2003/0051500 A1 | * | 3/2003 | Asfia ..................... B64D 13/06 |
| | | | 62/402 |
| 2003/0126880 A1 | | 7/2003 | Zywiak |
| 2004/0195448 A1 | | 10/2004 | Flatman |
| 2006/0117956 A1 | | 6/2006 | Schwalm |
| 2006/0231680 A1 | | 10/2006 | Derouineau et al. |
| 2007/0062371 A1 | | 3/2007 | Eilers |
| 2011/0005244 A1 | | 1/2011 | Finney et al. |
| 2011/0131999 A1 | | 6/2011 | Gao et al. |
| 2014/0326135 A1 | | 11/2014 | Massey et al. |
| 2014/0331692 A1 | | 11/2014 | Eowsakul |
| 2014/0357176 A1 | | 12/2014 | Beers et al. |
| 2015/0004011 A1 | | 1/2015 | Army et al. |
| 2015/0104301 A1 | | 4/2015 | Colson et al. |
| 2015/0314877 A1 | | 11/2015 | Mcauliffe et al. |
| 2016/0025339 A1 | | 1/2016 | Kamath et al. |
| 2016/0153460 A1 | | 6/2016 | Okabe |
| 2016/0311551 A1 | | 10/2016 | Daniello |
| 2019/0002109 A1 | | 1/2019 | Bruno et al. |
| 2019/0291875 A1 | | 9/2019 | Behrens et al. |
| 2020/0130849 A1 | | 4/2020 | Hennig et al. |
| 2021/0300575 A1 | | 9/2021 | Staubach et al. |
| 2022/0340287 A1 | | 10/2022 | Mackin et al. |
| 2022/0364513 A1 | | 11/2022 | Muldoon et al. |
| 2023/0058816 A1 | | 2/2023 | Mikic et al. |
| 2023/0069975 A1 | * | 3/2023 | Quartarone ........... B64D 13/08 |
| 2023/0303252 A1 | * | 9/2023 | Vignali ................. B64D 13/06 |

FOREIGN PATENT DOCUMENTS

| | | | |
|---|---|---|---|
| EP | 4049934 A1 | 8/2022 | |
| EP | 4279387 A1 * | 11/2023 | ............. B64D 37/30 |
| JP | H05322216 A | 12/1993 | |
| WO | 2022189154 A1 | 9/2022 | |
| WO | 2022189157 A1 | 9/2022 | |

OTHER PUBLICATIONS

Extended European Search Report for EP Application No. 24185834.9, dated Nov. 27, 2024, 11 pages.
Extended European Patent Report for European Patent Application No. 18171633.3, dated Jun. 22, 2018, 9 pages.
Communication pursuant to Article 94(3) EPC for European Patent Application No. 18171633.3, dated Oct. 22, 2019, 5 pages.
Extended European Search Report for EP Application No. 24185811.7, dated Dec. 2, 2024, 11 pages.

* cited by examiner

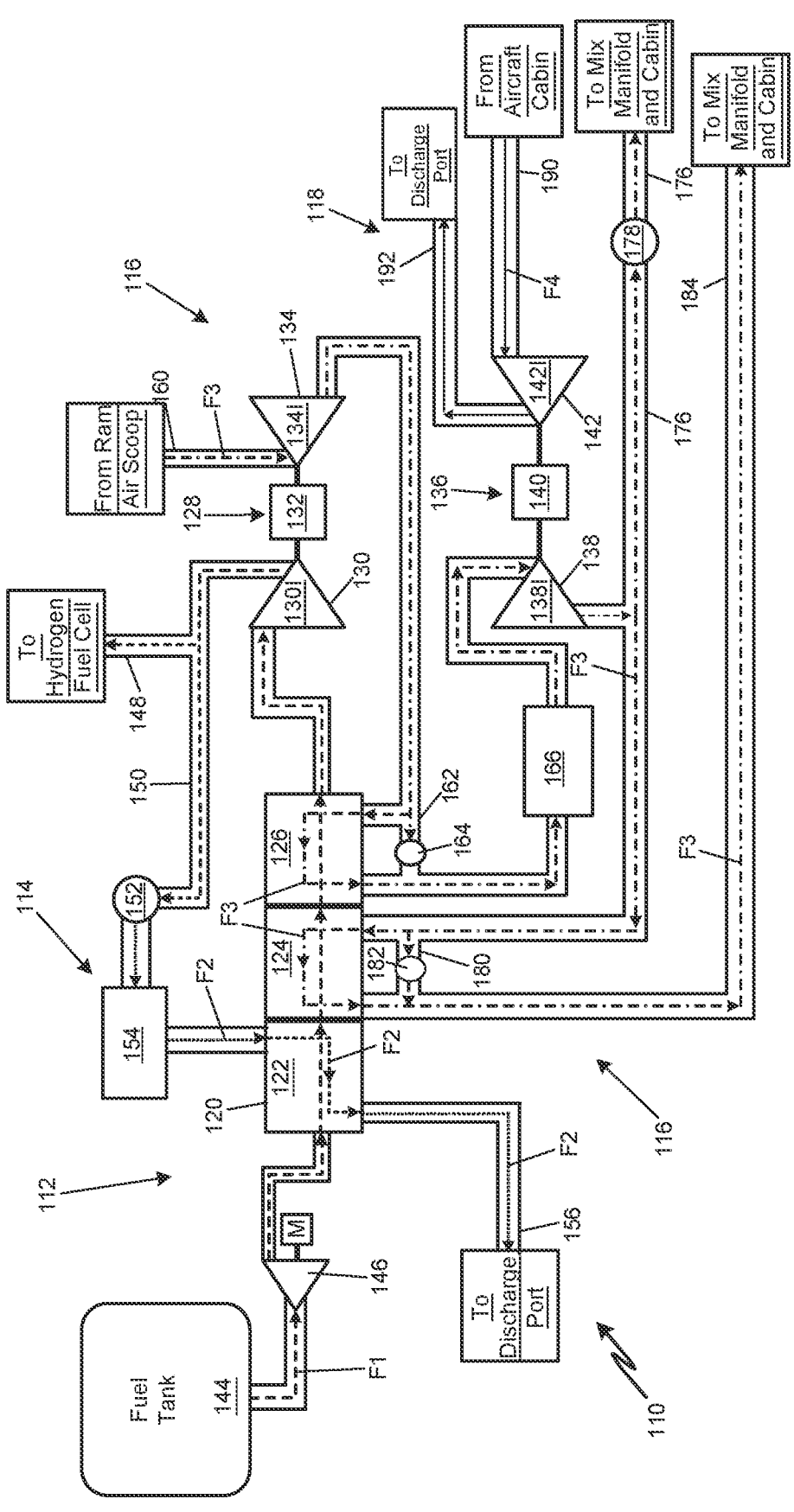

ENVIRONMENTAL CONTROL SYSTEM WITH LIQUID HYDROGEN FUEL VAPORIZATION FOR A HYDROGEN FUEL CELL

BACKGROUND

This application relates to aircraft environmental control systems and, more particularly, aircraft environmental control systems utilizing cryogenic liquid fuel as a heat sink.

Liquid hydrogen fuel can be used in hydrogen fuel cells to power an aircraft. Liquid hydrogen fuel is stored in cryogenic tanks on the aircraft. Liquid hydrogen must be vaporized to use in the hydrogen fuel cell.

Aircraft also utilize environmental control systems to provide air at a usable pressure, temperature, and humidity to the aircraft. Environmental control systems for aircraft use air compressors, heat exchangers, and water collectors to cool, pressurize, and dehumidify air for use in passenger cabins and electronics bays. Environmental control systems need to act as heat sinks to cool air for use in aircraft cabins and to provide for cooling for electrical components and other heat loads on the aircraft.

SUMMARY

An aircraft environmental control system includes a tank holding cryogenic fuel, a heat exchanger, a first rotary machine, a first outlet duct, and a second outlet duct. The heat exchanger includes a cold side flow path downstream from the tank to evaporate the fuel, a first hot side flow path, and a second hot side flow path. The first rotary machine includes a first compressor section with an impeller upstream from the second hot side flow path. The first rotary machine includes a first shaft tied to the impeller and a first motor to rotate the impeller. The first duct and the second duct are downstream from the heat exchanger. The first duct provides a first portion of vaporized fuel to a power generator. The second duct provides a second portion of vaporized fuel to a burner that creates hot air to move through the first hot side flow path. An environmental control system for an aircraft includes a fuel storage tank holding liquid hydrogen fuel; a heat exchanger, a first rotary machine, and a second rotary machine. The heat exchanger includes a cold side flow path through the heat exchanger downstream from the fuel storage tank to evaporate the liquid hydrogen fuel using heat generated by the environmental control system in the aircraft. The heat exchanger also includes a first heat exchanger compartment in an upstream portion of the cold side flow path. The first compartment of the heat exchanger includes a first hot side flow path. A fluid moving through the first hot side flow path is from a hydrogen fuel burner. The heat exchanger also includes a second heat exchanger compartment downstream from the first section in the cold side flow path. The second section includes a second hot side flow path. The heat exchanger also includes a third heat exchanger compartment directly downstream from the second section in the cold side flow path. The third section includes a third hot side flow path. The first rotary machine includes a first compressor section, a first shaft, and a first motor. The first compressor section is upstream from the third hot side flow path and includes a first compressor impeller. The first shaft is mechanically tied to the first compressor impeller and the first motor. The first motor drives rotation of the first compressor impeller. Hot compressed air from the first compressor section moves through the third hot side flow path in the heat exchanger. The heat from the compressed air is transferred to the hydrogen fuel in the cold side flow path of the heat exchanger. The second rotary machine includes a second compressor section, a second shaft, and a second motor. The second compressor section is downstream from the first compressor section and upstream from the second hot side flow path through the heat exchanger. The second compressor section includes a second compressor impeller. The second shaft is mechanically tied to the second compressor impeller and the second motor. The second motor rotates the second impeller. The hot compressed air from the second compressor section moves through the second hot side flow path in the heat exchanger. The heat from the compressed air is transferred to the hydrogen fuel in the cold side flow path of the heat exchanger.

BRIEF DESCRIPTION OF THE DRAWINGS

FIG. 1 is a schematic view of an environmental control system.

DETAILED DESCRIPTION

Aircraft powered by liquid hydrogen present multiple opportunities to increase efficiency in environmental control systems and provide a higher quality conditioned air to the cabin. Hydrogen fuel cells can use hydrogen and oxygen to power vehicles, including aircraft. In aircraft that use hydrogen fuel, the hydrogen is stored as liquid in cryogenic tanks. Cold liquid hydrogen is evaporated before conversion to electrical power in the fuel cell. Aircraft that use hydrogen require inputs of heat to vaporize the hydrogen fuel. Stated another way, aircraft that use hydrogen have large heat sinks in the evaporating fuel. This large heat sink creates an opportunity to cool heat loads generated elsewhere in the aircraft, specifically environmental control systems.

Environmental control systems, sometimes referred to as air conditioning packs, cool, dehumidify, and pressurize air for use in an aircraft cabin. Pressurizing air in a compressor heats the air. Compressed air needs to be cooled to dehumidify the air and provide the air at a comfortable temperature to the aircraft cabin. Previous environmental control systems typically include a ram air cooling circuit to cool heat loads generated by compressing air. Ram air cooling circuits increase drag on an aircraft, thereby decreasing efficiency. Combining an environmental control system with liquid hydrogen fuel creates an efficient way to vaporize liquid hydrogen fuels for use in powering the aircraft and to cool heat loads generated by the environmental control system. Liquid hydrogen is vaporized for use in the hydrogen fuel by heat transfer from compressed air generated in the environmental control system. Further, heat created by the compressors in the environmental control system is cooled by the liquid hydrogen fuel.

FIG. 1 shows a schematic of environmental control system 110, which includes four systems: liquid fuel vaporization system 112 with first flow path F1, preheating system 114 with second flow path F2, air conditioning system 116 with third flow path F3, and energy recovery system 118 with fourth flow path F4. Environmental controls system 110 also includes heat exchanger 120 with first compartment 122, second compartment 124, and third compartment 126; first turbocompressor 128 with first turbine section 130 having first turbine impeller 130I, first motor 132, and first compressor section 134 having first compressor impeller 134I; and second turbocompressor 136 with second compressor section 138 having second compressor impeller 138I, second motor 140, and second turbine section 142 having second turbine impeller 142I. Liquid fuel vaporization system 112 includes fuel storage tank 144; pump 146; heat exchanger 120 with first compartment 122, second compartment 124, and third compartment 126; first turbocompressor 128 including first turbine section 130, first motor 132, and first compressor section 134; fuel cell inlet duct 148; and preheater outlet duct 150. Preheating system 114 includes control valve 152, fuel burner 154, first compartment 122 of heat exchanger 120, and outlet duct 156. Air conditioning system 116 includes inlet duct 160; first turbocompressor 128; third compartment 126 of heat exchanger 120; first bypass duct 162 with first bypass valve 164; water extractor 166; second turbocompressor 136 with second compressor section 138, second motor 140, and second turbine section 142; hot air supply duct 176 with hot air modulating valve 178; second compartment 124 of heat exchanger 120; second bypass duct 180 with second bypass valve 182; and cold air supply duct 184. Energy recovery system 118 also includes inlet duct 190, second turbine section 142 of second turbocompressor 136, and outlet duct 192. Each of systems 112-118 will be described in more detail in turn below.

Discussion of FIG. 1 will begin with how the four systems 112-118 in environmental control system 110 operate together. Then, each of systems 112-118 will be described in more detail in turn. To begin, environmental control system 110 includes liquid fuel vaporization system 112 with first flow path F1, heat extraction system 114 with second flow path F2, air conditioning system 116 with third flow path F3, and energy recovery system 118 with fourth flow path F4. Environmental control system 110 also includes heat exchanger 120 with first compartment 122, second compartment 124, and third compartment 126; first turbocompressor 128 with first turbine section 130, first motor 132, and first compressor section 134; and second turbocompressor 136 with second compressor section 138, second motor 140, and second turbine section 142.

Liquid fuel vaporization system 112 is in a top left quadrant of the schematic in FIG. 2. Liquid fuel vaporization system 112 includes flow path F1, which is denoted in FIG. 1 by arrows with dashed tails. Fuel used to power the aircraft is stored as a cryogenic liquid. Liquid fuel vaporization system 112 vaporizes (or evaporates) the fuel for use in a hydrogen fuel cell (or other kind of power generator that utilizes gaseous fuel). The hydrogen fuel cell powers the aircraft. In this example, the fuel is hydrogen, however liquid fuel vaporization system 112 can be used for other types of fuels. Liquid fuel vaporization system 112 takes liquid hydrogen from cryogenic storage tanks and vaporizes the hydrogen for use in the hydrogen fuel cell. Liquid fuel vaporization system 112 also acts as a heat sink to cool heat loads generated in the aircraft because the fuel is cold when stored as a liquid in the aircraft and absorbs the heat loads to vaporize the hydrogen.

Preheating system 114 is also in the top left quadrant of FIG. 2. Preheating system 114 includes second flow path F2, which is denoted in FIG. 2 by arrows with dotted tails. Preheating system 114 utilizes a fuel burner to create heat to do part of the fuel vaporization. Heat from the fuel burner reduces potential icing in air conditioning system 116.

Air conditioning system 116 is in upper right and lower left quadrants of FIG. 1. Air conditioning system 116 includes third flow path F3, which is denoted in FIG. 1 by arrows with alternating dashes and dots. Air conditioning system 116 takes air from an external source and provides the air to a cabin of the aircraft at proper pressures, temperatures, and humidities. Air delivered to the cabin from air conditioning system 116 is sourced from external air and is very unlikely to be contaminated with fuel, oil, or other exhaust gasses, unlike bleed air from an engine or auxiliary power unit (APU). Air is cooled by the cold fuel in liquid fuel vaporization system 112, eliminating a ram cooling circuit utilized in previous environmental control system designs.

Energy recovery system 118 is in a lower right quadrant of FIG. 2. Energy recovery system 118 includes flow path F4, which is denoted in FIG. 2 by arrows with solid lines. Energy recovery system 118 capitalizes on pressurized cabin air that would flow out of the aircraft through throttling valves that regulate the pressure of the aircraft cabin. Energy recovery system 118 turns kinetic energy in outflowing pressurized air from the cabin into shaft power used to reduce the electrical power required to drive the motorized compressor section (for example, second compressor section 138 of second turbocompressor 136).

Environmental control system 110 includes several components that are used by multiple systems 112-118. These components include heat exchanger 120, first turbocompressor 128, and second turbocompressor 136. Heat exchanger 120 is used by fuel vaporization system 112, preheating system 114, and air conditioning system 116. First turbocompressor 128 is used by fuel vaporization system 112 and air conditioning system 116. Second turbocompressor 136 is used by air conditioning system 116 and energy recovery system 118. Heat exchanger 120, first turbocompressor 128, and second turbocompressor 136 will be discussed in turn in the following paragraphs.

Heat exchanger 120 is used to vaporize fuel in fuel vaporization system 112 and cool air being conditioned for use in the cabin by air conditioning system 116. Heat exchanger 120 has a cold side flow path (followed by first flow path F1 of fuel vaporization system 112) to vaporize the cryogenic fuel and multiple hot side flow paths (followed by second flow path F2 of heat extraction system 114 and third flow path F3 of air conditioning system 116) to cool heat loads generated in the aircraft. Heat exchanger 120 also includes first compartment 122, second compartment 124, and third compartment 126. First compartment 122 is an upstream compartment in relation to the cold side flow path followed by fuel evaporation system 112. Third compartment 126 is a downstream compartment, and second compartment 124 is between first compartment 122 and third compartment 126. The cold side flow path through heat exchanger 120 moves through first compartment 122, second compartment 124, and third compartment 126. The hot side flow paths are separated from one another in each of first compartment 122, second compartment 124, and third compartment 126. Movement of heat radiating from each of the hot side flow paths is limited between first compartment 122, second compartment 124, and third compartment 126 due to physical separation of the three compartments 122-126.

In heat exchanger 120, first flow path F1 of fuel vaporization system 112 interacts with both second flow path F2 of preheating system 114 and third flow path F3 of air conditioning system 116. Fuel moving along first flow path F1 is vaporized by heat from fuel moving along second flow path F2 in first compartment 122 of heat exchanger 120. Fuel moving along first flow path F1 is cold from storage. Heated gas moving along second flow path F2 through heat exchanger 120 is hot from fuel burner 154 (which will be discussed in more detail below in relation to preheating system 114). Heat is transferred from the heated gas in second flow path F2 to the fuel in first flow path F1. The heated gas heats and vaporizes the hydrogen fuel moving through first flow path F1 in heat exchanger 120.

First flow path F1 of fuel vaporization system 112 also interacts with third flow path F3 of air conditioning system 116 in heat exchanger 120. There are two points where third flow path F3 interacts with first flow path F1. One is in second compartment 124 of heat exchanger 120, and the other is at third compartment 126. At both points, fuel moving through first flow path F1 is cold. Third flow path F3 is hot because air has been warmed by first compressor section 134 in first turbocompressor 128 and second compressor section 138 in second turbocompressor 136. Energy is transferred from air in third flow path F3 to fuel in first flow path F1. Interactions of first flow path F1, second flow path F2, and third flow path F3 in heat exchanger 120 vaporize fuel for use in the hydrogen fuel cell and cool air for use in the aircraft cabin efficiently utilizing a cold sink (liquid fuel) and heat loads (exhaust gas and compressor outputs) already available on the aircraft.

Fuel evaporation system 112 and air conditioning system 116 both interact with first turbocompressor 128, which includes first turbine section 130 with first turbine impeller 130I, first motor 132, and first compressor section 134 with first compressor impeller 134I. In the schematic shown in FIG. 1, first turbine section 130 is on a left of first turbocompressor 128 and first compressor section 134 is on a right with first motor 132 in the middle. First turbine impeller 130I and first compressor impeller 134I are mechanically tied to one another and to first motor 132. First motor 132 and first turbine impeller 130I are both configured to turn first compressor impeller 134I. First motor 132 uses electrical energy to turn first compressor impeller 134I. Fluid moving along first flow path F1 of fuel evaporation system 112 expands through first turbine impeller 130I of first turbine section 130, which captures energy in the expanded fuel and turns first compressor impeller 134I. First compressor impeller 134I is mainly turned by first motor 132, although in some cases there may be sufficient power available from the first turbine impeller 130I to drive the compressor without the addition of electrical power. It is conceivable that the first motor 132 may be used as a generator if the shaft power available from turbine 130I exceeds the shaft power required to drive first compressor 134I. In this case the excess electrical energy would be returned to the aircraft electrical system to reduce its electrical power demand and improve overall system efficiency. First turbine section 130 reduces input from first motor 132 and utilizes energy created by fuel evaporating in liquid fuel evaporation system 112. First compressor section 134 compresses air moving through third flow path F3 of air conditioning system 116. First turbocompressor 128 recovers energy from the vaporization of fuel moving along first flow path F1 to compress air moving along third flow path F3, increasing the efficiency of environmental control system 110.

Air conditioning system 116 and energy recovery system 118 both interact with second turbocompressor 136, which includes second compressor section 138 with second compressor impeller 138I, second motor 140, and second turbine section 142 with second turbine impeller 142I. In the schematic shown in FIG. 1, second compressor section 138 is on a left side of second turbocompressor 136 and second turbine section 142 is on a right side with second motor 140 in a middle. Second compressor impeller 138I and second turbine impeller 142I are mechanically tied to one another and to second motor 140. Second motor 140 and second turbine impeller 142I are both configured to turn second compressor impeller 138I. Second motor 140 uses electric energy to turn second compressor impeller 138I. Fluid moving along fourth flow path F4 of energy recovery system 118 expands through second turbine impeller 142I of second turbine section 142, which captures energy from pressurized air leaving the aircraft cabin to turn second compressor impeller 138I. Second compressor impeller 138I is mainly turned by second motor 140. Second turbine section 142 reduces input from second motor 140 and utilizes energy from pressurized cabin air that is exiting the aircraft through energy recovery system 118. Second compressor section 138 compresses air moving through third flow path F3 of air conditioning system 116. Second turbocompressor 136 recovers energy from the expansion of cabin air moving along fourth flow path F4 to compress air moving along third flow path F3, increasing the efficiency of environmental control system 110.

Environmental control system 110 provides vaporized fuel to the hydrogen fuel cell (or another type of power generator) and conditioned air to an aircraft cabin efficiently. The fuel is vaporized by heat loads already generated in the aircraft by air conditioning system 116. Air conditioning system 116 also provides conditioned air from an external source without a risk of contamination from bleed air. Cooling heat loads generated by air conditioning system 116 utilizing fuel vaporization system 112 eliminates drag associated with a traditional ram cooling circuit. Environmental control system 110 also has a simplified design and reduced part count, leading to reduced construction cost and repairs. Environmental control system 110 also uses an electric architecture which is compatible with multiple power sources. Each of systems 112-118 will be described in more detail in turn below.

Liquid Fuel Vaporization System 112

Liquid fuel vaporization system 112 includes fuel storage tank 144, pump 146, heat exchanger 120 with first compartment 122, second compartment 124, and third compartment 126. System 112 also includes first turbocompressor 128 with first turbine section 130, first motor 132, and first compressor section 134. Liquid fuel vaporization system 112 also includes fuel cell inlet duct 148, preheater outlet duct 150, and first flow path F1.

Liquid fuel vaporization system 112 starts at fuel storage tank 144 and ends at fuel cell inlet duct 148 and preheater outlet duct 150. Fuel is stored as a cryogenic liquid in fuel storage tank 144. Fuel can be, for example, hydrogen and fuel storage tank 144 can be a cryogenic tank to store the liquid hydrogen. Fuel storage tank 144 is an upstream portion of first flow path F1. Pump 146 moves the fuel from fuel storage tank 144 to heat exchanger 120. The fuel moves through heat exchanger 120 and is vaporized by heat loads created by preheating system 114 (in first compartment 122) and air conditioning system 116 (in second compartment 124 and third compartment 126). After vaporizing, the gaseous fuel is ducted through first turbine section 130 of first turbocompressor 128 to capture some energy from the fuel expansion during vaporization. Vaporized fuel is ducted from first turbine section 130 to either fuel cell inlet duct 148, which is connected to the hydrogen fuel cell on the aircraft via a duct (not shown in FIG. 1), or preheater outlet duct 150, which is connected to preheating system 114.

Pump 146 is driven by an electric motor (M). Pump 146 moves liquid fuel out of storage tank 144 and into heat exchanger 120. A speed of pump 146 is determined based on a target outlet pressure at first turbine section 130 of first turbocompressor 128. The target outlet pressure is determined by needs of both the fuel cell and environmental control system 110 The target inlet pressure of first turbine section 130 depends on a required pressure of hydrogen to run the hydrogen fuel cell. A specific target outlet pressure is set based on an overall aircraft system architecture and factors in multiple component requirements. Using an electric motor (M) allows for the target outlet pressure to be reached in each system. An electric motor for use in pump 146 is efficient because the speed of pump 146 can be easily controlled and modulated, which avoids wasting power while pumping liquid fuel from fuel storage tank 144.

Heat exchanger 120 is part of liquid fuel vaporization system 112, preheating system 114, and air conditioning system 116, as discussed above. The cold side flow path is a portion of first flow path F1 and uses heat loads generated by preheating system 114 and air conditioning system 116 to vaporize the liquid fuel for use in the hydrogen fuel cell. The cold side flow path goes through first compartment 122, second compartment 124, and third compartment 126 of heat exchanger 120. The cold side flow path takes fuel moving along first flow path F1 from approximately a storage temperature of the fuel in fuel tank 144 to a target temperature for use in the power generator. As an example, when the fuel is hydrogen, the storage temperature is around −400° F. and the target temperature is approximately 90° F. and 110° F., and is preferably about 100° F.

The hot side flow paths in heat exchanger 120 are used to cool heat loads created on the aircraft using the cryogenic fuel as a heat sink. A first hot side flow path is through first compartment 122 of heat exchanger 120. The first hot side flow path is a portion of second flow path F2 of preheating system 114. A second hot side flow path is through second compartment 124 of heat exchanger 120 and is a portion of third flow path F3 of air conditioning system 116. A third hot side flow path is through third compartment 126 of heat exchanger 120 and is a portion of third flow path F3 of air conditioning system 116. The hot side flow paths of heat exchanger 120 will be discussed in more detail in relation to preheating system 114 and air conditioning system 116. The hot side flow paths provide heat to the cold side flow path followed by first flow path F1 of liquid fuel vaporization system 112.

After exiting the cold side flow path of heat exchanger 120, gaseous fuel is ducted from third compartment 126 of heat exchanger 120 to first turbine section 130 of first turbocompressor 128. First turbine impeller 130I in first turbine section 130 extracts energy from gaseous fuel in first flow path F1 and turns first compressor impeller 134I in first compressor section 134, which compresses air in air conditioning system 116. Positioning first turbine section 130 in first flow path F1 provides an opportunity to utilize excess energy from expansion undergone by liquid fuel during vaporization to lower the energy requirement of first motor 132 to power first compressor section 134. First turbine section 130 increases the efficiency of first turbocompressor 128 and environmental control system 110. Placing first turbine section 130 in first flow path F1 of fuel vaporization system 112 is optional. For example, a turbine-driven generator could be used instead. A turbine-driven generator would, for example, use extracted energy from gaseous fuel in first flow path F1 to charge a battery.

Gaseous fuel exits fuel vaporization system 112 at fuel cell inlet duct 148 and preheater outlet duct 150. Ductwork downstream from first turbine section 130 splits to provide some gaseous fuel to the power generator via fuel cell inlet duct 148 and to preheating system 114 via preheater outlet duct 150. Gaseous fuel moves from fuel cell inlet duct 148 to the power generator (hydrogen fuel cell) for the aircraft. How much fuel is provided by fuel vaporization system 112 is determined by a valve (not shown) on the hydrogen fuel cell. The valve opens or closes as necessary to modulate fuel flow for generating electrical energy with the hydrogen fuel cell to power generation levels commanded by the fuel cell control system. Gaseous fuel is also provided to preheating system 114 via preheater outlet duct 150.

Fuel vaporization system 112 allows fuel to be stored as a liquid on the aircraft, which reduces volume necessary for fuel storage. Fuel vaporization system 112 also acts as a heat sink to absorb heat loads from the power generator and air conditioning system 116.

Preheating System 114

Preheating system 114 creates heat to vaporize liquid fuel in first compartment 122 of heat exchanger 120. Preheating system 114 includes control valve 152, fuel burner 154, first compartment 122 of heat exchanger 120, and outlet duct 156. Preheating system 114 also includes second flow path F2.

Preheating system 114 starts at control valve 152 in an upstream portion of preheating system 114 and ends at outlet duct 156 at a downstream portion. Control valve 152 connects to preheater outlet duct 150 of fuel vaporization system 112. Gaseous fuel moves through control valve 152 to fuel burner 154, where fuel is combusted to generate heated air, including exhaust from the combustion of fuel. The heated air is then ducted through the first hot side flow path in first compartment 122 of heat exchanger 120. The heated air vaporizes cold fuel moving through the cold side flow path followed by first flow path F1 of fuel vaporization system 112 in heat exchanger 120. After moving through heat exchanger 120, the hot side follows second flow path F2 to outlet duct 156 and is discharged overboard through a port in a side of the aircraft (not shown in FIG. 1).

Control valve 152 controls the amount of fuel that will be used in fuel burner 154. Control valve 152 is an infinitely modulating valve positioned based on a temperature of the vaporized fuel entering first turbine section 130. Control valve 152 is set to open or close as necessary to heat the fuel in heat exchanger 120 to a target temperature. The target temperature is measured at an inlet of first turbine section 130 of first turbocompressor 128 and may also be monitored at points within first compartment 122, second compartment 124, and third compartment 126 of heat exchanger 122. For example, when using hydrogen fuel in a hydrogen fuel cell, the target temperature of the fuel at the outlet of first turbine section 130 between 90° F.-110° F. and is preferably about 100° F. The target temperature can alternatively be taken at an outlet of the cold side flow path of heat exchanger 120 followed by fuel in flow path F1 or outlet duct 150 of fuel vaporization system 112.

When fuel moving along first flow path F1 in fuel vaporization system 112 is below the targe temperature at the inlet of first turbine section 130, control valve 152 will open to allow more fuel into fuel burner 154. When fuel moving along first flow path F1 is above the target temperature, control valve 152 will close to allow less exhaust gas into preheating system 114. Control valve 152 can be programed to minimize fuel used in fuel burner 154 to keep environmental control system 110 efficient.

In the schematic shown in FIG. 1, first flow path F1 and second flow path F2 are shown as crossing one time in first compartment 122 of heat exchanger 120. First flow path F1 and second flow path F2 may cross multiple times and may follow parallel or anti-parallel circuitous paths within first compartment 122 of heat exchanger 120. Specific configurations of first flow path F1 and second flow path F2 in first compartment 122 of heat exchanger 120 will vary based on physical limitations of heat exchanger 120 or other heat transfer requirements necessary in first compartment 122.

Preheating system 114 provides a large amount of heat to liquid fuel moving through the cold side flow path in first compartment 122 of heat exchanger 120. When the liquid fuel is hydrogen, it is very cold as it enters heat exchanger 120 and requires a large amount of heating so water in third flow path F3 of air conditioning system 116 does not freeze in heat exchanger 120.

Air Conditioning System 116

Air conditioning system 116 provides air to an aircraft cabin at a proper pressure, temperature, and humidity. Conditioned air from air conditioning system 116 can also be used for other technical applications in the aircraft. Air conditioning system 116 includes inlet duct 160; first turbocompressor 128 with first turbine section 130, first motor 132, and first compressor section 134; first bypass duct 162 with first bypass valve 164; water extractor 166; second turbocompressor 136 with second compressor 170, second motor 140, and second turbine section 142; hot air supply duct 176 with hot air modulating valve 178; second bypass duct 180 with second bypass valve 182; and cold air supply duct 184. Air conditioning system 116 also includes third flow path F3.

Air conditioning system 116 starts at inlet duct 160 in an upstream portion of air conditioning system 116 and ends at hot air supply duct 176 and cold air supply duct 184 in downstream portions. Inlet duct 160 is an upstream portion of third flow path F3. Inlet duct 160 is open to an exterior of the aircraft and can utilize a ram air scoop (not shown) to draw in fresh air. Through inlet duct 160, exterior air is ducted to first compressor section 134 of first turbocompressor 128. Compressed air is then ducted to the third hot side flow path in third compartment 126 of heat exchanger 120. Air is cooled in third compartment 126 of heat exchanger 120 by fuel moving through the cold side flow path. Alternatively, all or a portion of the compressed air can bypass third compartment 126 through first bypass duct 162 when first bypass valve 164 is in an open position. Cooled air is ducted from third compartment 126 of heat exchanger 120 to water extractor 166. Cooled water condenses in the cooled air and water extractor 166 dehumidifies the air. Dehumidified air is ducted from water extractor 166 to second compressor section 138 of second turbocompressor 136. From there, compressed air moves either to the cabin through hot air supply duct 176 or to the second cooling pathway through second compartment 124 of heat exchanger 120. A portion of the compressed air ducted through hot air supply duct 176 moves through hot air modulating valve 178 before passing through a mix manifold (not shown in FIG. 1) and into the aircraft cabin. Another portion of the compressed air is ducted from second compressor section 138 to the second hot side flow path of second compartment 124 of heat exchanger 120 and is cooled by fuel moving through the cold side flow path of heat exchanger 120. Second bypass duct 180 with second bypass valve 182 allows for some or all of the air to bypass second compartment 124 of heat exchanger 120. From second compartment 124 of heat exchanger 120, air is ducted through cold air supply duct 184 to the mix manifold to be mixed with the hot air and provide conditioned air to the cabin at the proper temperature.

Inlet duct 160 is a source of external air to air conditioning system 116 and the aircraft cabin. Inlet duct 160 can be attached to an air scoop positioned through a a fuselage of the aircraft. Inlet duct 160 allows for fresh air, not bleed air, to be used in the aircraft cabin. This reduces the chance of contamination from bleed air. Other aircraft environmental control systems begin with bleed air from a gas turbine engine or APU. Use of bleed air has the potential to be contaminated with fuel and oil. Environmental control system 110 using inlet duct 160 attached to a fresh air source eliminates the need for bleed air and potential bleed air contamination the aircraft cabin.

First compressor section 134 utilizes first compressor impeller 134I to compress external air to drive air through third flow path F3 and provide properly pressurized air to the cabin. Both first motor 132 and first turbine section 130 drive rotation of the impeller of first compressor section 134. First compressor section 134 can be associated with a different type of rotary machine than first turbocompressor 128. For example, first compressor section 134 can alternatively be an electric motor driven compressor. First compressor section 134 compresses air to attain a target temperature and a target pressure. The target pressure depends on, for example, needs of the aircraft cabin (i.e., is the cabin under pressurized) and altitude of the aircraft. The target temperature depends on, for example, needs of the aircraft cabin (i.e., is the cabin too hot or too cold) and outlet temperature of fuel moving through the heating path in heat exchanger 120. As such, the target pressure and the target temperature may change during a flight. Utilizing an electric motor as first motor 132 allows for easy modulation of impeller speed of first compressor section 134 to meet the demands of the changing target pressures and target temperatures. An electric motor is also compatible with other sources of energy in the aircraft. Utilizing first turbocompressor 128 allows for first turbine section 130 to reduce motor input from first motor 132 by utilizing energy captured from expanded fuel in first flow path F1, as discussed above in relation to fuel vaporization system 112. First turbocompressor 128 thus increases the efficiency of air conditioning system 116.

Compressed air from first compressor section 134 has an increased temperature, so is ducted to third compartment 126 of heat exchanger 120 for cooling. Compressed air moves through the third hot side flow path in third compartment 126 of heat exchanger 120. In FIG. 1, the schematic shows first flow path F1 and third flow path F3 crossing twice. However, first flow path F1 and third flow path F3 can cross as many times as necessary to provide proper heat exchange within physical limitations of third compartment 126. Compressed air is cooled by the fuel moving along the cold side flow path in heat exchanger 120. The cooled air is cooled to a temperature targeted to maximize condensation in the air before it moves through water extractor 166. Water condenses in air at and below its dewpoint. Water extractor 166 removes a maximum amount of water when the air moving through is cold enough to create water droplets but not too cold to form ice on the surfaces in water extractor 166. Water extractor 166 ices over and becomes less effective or ineffective if the fluid temperature is too cold. Target temperatures for the cooled air leaving the third hot side flow path of heat exchanger 120 can be between 33° F.-38° F. The air leaving the hot side flow path in third compartment 126 of heat exchanger 120 following third flow path F3 is preferably about 34° F.

To help attain the target temperature, some air can flow through first bypass duct 162. An amount of air that flows through first bypass duct 162 is determined by a setting of first bypass valve 164. First bypass valve 164 is an infinitely modulating valve. The setting of first bypass valve 164 is determined based on a temperature of air flowing out of third compartment 126 in heat exchanger 120. For example, if air is too hot to have water droplets condense as it moves out of the third hot side flow path through heat exchanger 120, first bypass valve 164 closes. Alternatively, if air is too cold and water extractor 166 freezes, first bypass valve 164 opens.

After flowing out of third compartment 126 or bypass duct 162, air flows through water extractor 166 to dehumidify the air. Water extractor 166 collects condensed droplets of water from the cooled stream of air. Once air in third flow path F3 is dehumidified by water extractor 166, it is compressed by second compressor section 138 in second turbocompressor 136. Both second motor 140 and second turbine section 142 drive rotation of the impeller of second compressor section 138. Second compressor section 138 can be associated with a different type of rotary machine than second turbocompressor 136. For example, second compressor section 138 can alternatively be a motor driven compressor. Second compressor section 138 compresses air to attain a target temperature and a target pressure, just as discussed in relation to first compressor section 134 above. Utilizing an electric motor as second motor 140 allows for easy modulation of impeller speed of second compressor section 138 to meet the demands of the changing target pressures and temperatures throughout a flight. Second motor 140 is also compatible with other sources of energy in the aircraft. Utilizing second turbocompressor 136 allows for second turbine section 142 to reduce motor input from first motor 132 by utilizing energy captured from pressurized cabin air in fourth flow path F4, as will be discussed in greater detail in relation to energy recovery system 118 below. Second turbocompressor 136 increases the efficiency of air conditioning system 116.

From an outlet of second compressor section 138, third flow path F3 splits. A first portion of air follows hot air supply duct 176 through hot air modulating valve 178 to the mix manifold and delivery to the cabin. A second portion of air flows to second compartment 124 of heat exchanger 120 for cooling.

The first portion of air leaving second compressor section 138 is ready for delivery to the aircraft cabin via hot air supply duct 176. Air in hot air supply duct 176 is at an approximate temperature of 150° F. Temperature of the hot air in hot air supply duct 176 depends on the temperature of air exiting second compressor section 138. An amount of hot air delivered to the aircraft cabin via the mix manifold is based on a setting of hot air modulating valve 178, which is positioned in hot air supply duct 176. Hot air modulating valve 178 is an infinitely modulating valve. The position of hot air modulating valve 178 depends on the desired temperature in the cabin. For example, if the aircraft cabin is too cold, hot air modulating valve 178 will be positioned to allow more hot air from hot air supply duct 176 into the mix manifold for delivery to the aircraft cabin. If the aircraft cabin is too hot, hot air modulating valve 178 will be positioned to allow less hot air from hot air supply duct 176 into the mix manifold for delivery to the aircraft cabin.

The second portion of air from the outlet of second compressor section 138 is ducted through the second hot side flow path in second compartment 124 of heat exchanger 120. In the schematic shown in FIG. 1, first flow path F1 and third flow path F3 are shown as crossing one another twice. However, first flow path F1 and third flow path F3 can cross one another as many times as necessary to provide proper heat exchange within the physical limitations of second compartment 124. Compressed air from second compressor section 138 is cooled in second compartment 124 of heat exchanger 120 by fuel in the cold side flow path of heat exchanger 120. Air is cooled to a target temperature determined by needs of the aircraft cabin. Typically, environmental control systems are limited by an amount of cold air they can supply. As such, air leaving second compartment 124 of heat exchanger 120 is targeted to be about 32° F., or as cold as possible without freezing ductwork in the aircraft. If air is too cold, air in third flow path F3 can bypass second compartment 124 of heat exchanger 120 via second bypass duct 180. Second bypass duct 180 includes second bypass valve 182, which operates as first bypass valve 164 operates. A setting of second bypass valve 182 is determined by the amount of cold air necessary in the cabin. If air being delivered to the cabin is too cold, second bypass valve 182 will open to allow air to bypass the third hot side flow path in heat exchanger 120. Second bypass valve 182 will also open if the ductwork of air conditioning system 116 downstream of second compartment 124 in heat exchanger 120 is beginning to freeze. A target temperature of air downstream from second bypass valve 182 is between 33° F. and 100° F.

Cold air exits the air conditioning system 116 through cold air supply duct 184, which connects to the mix manifold. At the mix manifold, hot air from hot air supply duct 176 and cold air from the cold air supply duct 184 are combined to create air at the desired temperature to the cabin. From the mix manifold, conditioned air is delivered to the aircraft cabin.

Air conditioning system 116 in environmental control system 110 has several benefits. First, only external air is conditioned and delivered to the aircraft cabin. This eliminates the use of bleed air in air conditioning system 116 and the resultant potential for contamination. Air conditioning system 116 uses cryogenic fuel in fuel vaporization flow path 112 as a heat sink, which eliminates need for other heat sinks in environmental control system 110 like ram air cooling circuits which create drag on the aircraft. This makes air conditioning system 116 efficient.

Energy Recovery System 118

Environmental control system 110 includes energy recovery system 118 to harness otherwise wasted energy from pressurized cabin air being discharged overboard. Energy recovery system 118 includes inlet duct 190, second turbine section 142 of second turbocompressor 136, and outlet duct 192.

Energy Recovery System 118 starts at inlet duct 190 in an upstream portion of Energy Recovery System 118 and ends at outlet duct 192 in a downstream portion. Inlet duct 190 is downstream from and connected to the cabin of the aircraft, which is pressurized by air conditioning system 116. Pressurized air from the aircraft cabin is ducted to inlet duct 190, which directs pressurized air through second turbine section 142. Pressurized air from the aircraft cabin is then forced through the impeller in second turbine section 142. As the pressurized air expands through and turns the impeller in second turbine section 142, the resulting torque is transferred through the shaft in second turbocompressor 136 to the impeller in second compressor section 138. After exiting second turbine section 142, air exits energy recovery system 118 through outlet duct 192, which connects to an overboard discharge port (not shown) in a side of the aircraft.

Energy captured by second turbine section 142 reduces the amount of power second motor 140 needs to provide to second compressor section 138. This increases the efficiency of environmental control system 110. Second turbine section 142 can alternatively be part of a different type of rotary machine besides a turbocompressor. For example, second turbine section 142 could be utilized in a generator with a turbine section and a motor. Second turbine impeller 142I in second turbine 142 section is turned by pressurized air exiting the aircraft cabin and torque produced by the impeller rotates the motor to produce electrical energy.

Energy recovery system 118 can be added to any aircraft with a pressurized cabin. Federal Airline Association (FAA) regulations require pressurized air to be delivered to an aircraft cabin to maintain a required flow and pressure based on the number of passengers in a cabin and the size of the cabin. Pressure in the cabin is measured at outlet ports in sides of an aircraft. Typically, pressurized air is discharged directly through the outlet ports to maintain proper cabin pressurization. However, energy is lost by throttling pressurized air directly out of an aircraft. Energy recovery system 118 can be positioned downstream of cabin pressure regulating valves. Then, energy in the pressurized air exiting the aircraft can be captured by second turbine section 142 of second turbocompressor 136. This increases the efficiency of second turbocompressor 136 because some shaft power necessary for second compressor section 138 can be provided by second turbine section 142 rather than second motor 140. This increases the overall efficiency of environmental control system 110.

Discussion of Possible Embodiments

The following are non-exclusive descriptions of possible embodiments of the present invention.

An aircraft environmental control system includes a tank holding cryogenic fuel, a heat exchanger, a first rotary machine, a first outlet duct, and a second outlet duct. The heat exchanger includes a cold side flow path downstream from the tank to evaporate the fuel, a first hot side flow path, and a second hot side flow path. The first rotary machine includes a first compressor section with an impeller upstream from the second hot side flow path. The first rotary machine includes a first shaft tied to the impeller and a first motor to rotate the impeller. The first duct and the second duct are downstream from the heat exchanger. The first duct provides a first portion of vaporized fuel to a power generator. The second duct provides a second portion of vaporized fuel to a burner that creates hot air to move through the first hot side flow path.

The environmental control system of the preceding paragraph can optionally include, additionally and/or alternatively, any one or more of the following features, configurations and/or additional components:

A further embodiment of the foregoing environmental control system, wherein the first rotary machine includes a first turbine section including a first turbine impeller connected to the first shaft. The first turbine impeller is downstream from the cold side flow path through the heat exchanger. The first impeller captures energy from fuel expansion to drive rotation of the first shaft and the first compressor impeller.

A further embodiment of any of the foregoing environmental control systems, wherein the heat exchanger includes a first heat exchanger compartment in an upstream portion of the cold side flow path of the heat exchanger. The first heat exchanger compartment includes the first hot side flow path.

A further embodiment of any of the foregoing environmental control systems, wherein the heat exchanger includes a second heat exchanger compartment directly downstream from the first heat exchanger compartment in the cold side flow path. The second heat exchanger compartment includes the second hot side flow path.

A further embodiment of any of the foregoing environmental control systems, wherein the heat exchanger includes a third heat exchanger compartment directly downstream from the second heat exchanger compartment in the cold side flow path. The third heat exchanger compartment includes a third hot side flow path downstream from the first compressor section and upstream from the second compressor section. The third hot side flow path cools a third hot fluid generated in the aircraft.

A further embodiment of any of the foregoing environmental control systems, wherein the second hot fluid is compressed air from the second compressor section, and wherein the third hot fluid is compressed air from the first compressor section.

A further embodiment of any of the foregoing environmental control systems, and further including a first bypass duct with a first bypass valve downstream from the first compressor section to allow fluid to bypass the third hot side flow path through the heat exchanger. A second bypass duct with a second bypass valve downstream from the second compressor section to allow fluid to bypass the second hot side flow path through the heat exchanger. The first bypass valve is a modulating valve that is set so fluid downstream from the third hot side flow path is between 33° F. and 36° F. The second bypass valve is a modulating valve that is set so fluid downstream from the second hot side flow path is between 33° F. and 100° F.

A further embodiment of any of the foregoing environmental control systems, and further including a water extractor upstream from the second compressor section.

A further embodiment of any of the foregoing environmental control systems, wherein the second rotary machine includes a second turbine section with a second turbine impeller connected to the second shaft. The second turbine impeller is downstream from a pressurized space in the aircraft. The second turbine impeller captures energy from pressurized air exiting the pressurized space to drive rotation of the second shaft and the second compressor impeller.

A further embodiment of any of the foregoing environmental control systems, wherein the pressurized space in the aircraft is a passenger cabin.

A further embodiment of any of the foregoing environmental control systems, wherein the second turbine section is upstream from an overboard discharge port.

A further embodiment of any of the foregoing environmental control systems, and further comprising a valve controlling an amount of fuel entering the fuel burner.

A further embodiment of any of the foregoing environmental control systems, wherein the liquid fuel moving through the cold side flow path of the heat exchanger is hydrogen.

A further embodiment of any of the foregoing environmental control systems, wherein the valve is set to heat the hydrogen to a target temperature between 95° F. and 105° F.

A further embodiment of any of the foregoing environmental control systems, wherein the target temperature is measured at an outlet of the first turbine section.

A further embodiment of any of the foregoing environmental control systems, and further comprising a pump between the fuel storage tank and the heat exchanger.

A further embodiment of any of the foregoing environmental control systems, and further comprising a hot conditioned air duct downstream from the first compressor to deliver hot conditioned air to the aircraft.

A further embodiment of any of the foregoing environmental control systems, wherein a cold conditioned air duct downstream from the second hot side flow path through the heat exchanger to provide cold air to the aircraft.

An environmental control system for an aircraft includes a fuel storage tank holding liquid hydrogen fuel; a heat exchanger, a first rotary machine, and a second rotary machine. The heat exchanger includes a cold side flow path through the heat exchanger downstream from the fuel storage tank to evaporate the liquid hydrogen fuel using heat generated by the environmental control system in the aircraft. The heat exchanger also includes a first heat exchanger compartment in an upstream portion of the cold side flow path. The first compartment of the heat exchanger includes a first hot side flow path. A fluid moving through the first hot side flow path is from a hydrogen fuel burner. The heat exchanger also includes a second heat exchanger compartment downstream from the first section in the cold side flow path. The second section includes a second hot side flow path. The heat exchanger also includes a third heat exchanger compartment directly downstream from the second section in the cold side flow path. The third section includes a third hot side flow path. The first rotary machine includes a first compressor section, a first shaft, and a first motor. The first compressor section is upstream from the third hot side flow path and includes a first compressor impeller. The first shaft is mechanically tied to the first compressor impeller and the first motor. The first motor drives rotation of the first compressor impeller. Hot compressed air from the first compressor section moves through the third hot side flow path in the heat exchanger. The heat from the compressed air is transferred to the hydrogen fuel in the cold side flow path of the heat exchanger. The second rotary machine includes a second compressor section, a second shaft, and a second motor. The second compressor section is downstream from the first compressor section and upstream from the second hot side flow path through the heat exchanger. The second compressor section includes a second compressor impeller. The second shaft is mechanically tied to the second compressor impeller and the second motor. The second motor rotates the second impeller. The hot compressed air from the second compressor section moves through the second hot side flow path in the heat exchanger. The heat from the compressed air is transferred to the hydrogen fuel in the cold side flow path of the heat exchanger.

The environmental control system of the preceding paragraph can optionally include, additionally and/or alternatively, any one or more of the following features, configurations and/or additional components:

A further embodiment of the foregoing environmental control system, wherein the hydrogen fuel exits the cold side flow path through the heat exchanger as a gas.

A further embodiment of any of the foregoing environmental control systems, wherein the first rotary machine further comprises a first turbine section including a first turbine impeller connected to the first shaft. The first turbine impeller is downstream from the cold side flow path through the heat exchanger and captures energy from the gaseous hydrogen fuel to drive rotation of the first compressor section.

A further embodiment of any of the foregoing environmental control systems, wherein the hydrogen fuel burner is downstream from a valve controlling an amount of hydrogen provided to the burner.

A further embodiment of any of the foregoing environmental control systems, wherein the valve is set to heat the hydrogen moving through the cold side flow path to a target temperature between 95° F. and 105° F. at an outlet of the first turbine section.

A further embodiment of any of the foregoing environmental control systems, wherein the hydrogen fuel burner is downstream from the cold side flow path through the heat exchanger.

A further embodiment of any of the foregoing environmental control systems, wherein the second rotary machine further includes a second turbine section including a second turbine impeller connected to the second shaft. The second turbine impeller is downstream from a pressurized aircraft cabin. The second turbine impeller captures energy from pressurized air exiting the pressurized space to drive rotation of the second shaft and the second compressor impeller A further embodiment of any of the foregoing environmental control systems, and further including a pump between the fuel storage tank and the heat exchanger. The pump includes an electric motor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An environmental control system for an aircraft, the system comprising:
    a fuel storage tank for holding liquid fuel;
    a heat exchanger comprising:
        a cold side flow path through the heat exchanger downstream from the fuel storage tank to vaporize the liquid fuel using hot fluids generated in the aircraft;
        a first hot side flow path through the heat exchanger; and
        a second hot side flow path through the heat exchanger;
    a first rotary machine comprising:
        a first compressor section upstream from the second hot side flow path through the heat exchanger, the first compressor section including a first compressor impeller;
        a first shaft mechanically tied to the first compressor impeller; and
        a first motor connected to the first shaft to rotate of the first compressor impeller; and
    a first outlet duct downstream from the heat exchanger to provide a first portion of the vaporized fuel to a power generator on the aircraft; and
    a second outlet duct downstream from the heat exchanger to provide a second portion of the vaporized fuel to a fuel burner, wherein the fuel burner creates hot exhaust air that moves through the first hot side flow path in the heat exchanger.

2. The environmental control system of claim 1, wherein first rotary machine further comprises:
    a first turbine section including a first turbine impeller connected to the first shaft, wherein the first turbine impeller is downstream from the cold side flow path through the heat exchanger, and wherein the first impeller captures energy from fuel expansion to drive rotation of the first shaft and the first compressor impeller, a second rotary machine comprising:

a second compressor section downstream from the first compressor section, the second compressor section including a second compressor impeller;

a second shaft mechanically tied to the second compressor impeller; and a second motor connected to the second shaft to rotate the second compressor impeller.

3. The environmental control system of claim 2, wherein the heat exchanger comprises:

a first heat exchanger compartment in an upstream portion of the cold side flow path of the heat exchanger, wherein the first heat exchanger compartment includes the first hot side flow path;

a second heat exchanger compartment directly downstream from the first heat exchanger compartment in the cold side flow path, wherein the second heat exchanger compartment includes the second hot side flow path; and a third heat exchanger compartment directly downstream from the second heat exchanger compartment in the cold side flow path, wherein the third heat exchanger compartment includes a third hot side flow path downstream from the first compressor section and upstream from the second compressor section, and wherein the third hot side flow path cools a third hot fluid generated in the aircraft.

4. The environmental control system of claim 3, wherein the second hot fluid is compressed air from the second compressor section, and wherein the third hot fluid is compressed air from the first compressor section.

5. The environmental control system of claim 3, and further comprising:

a first bypass duct with a first bypass valve downstream from the first compressor section to allow fluid to bypass the third hot side flow path through the heat exchanger; and a second bypass duct with a second bypass valve downstream from the second compressor section to allow fluid to bypass the second hot side flow path through the heat exchanger;

wherein the first bypass valve is a modulating valve that is set so fluid downstream from the third hot side flow path is between 33° F. and 36° F.; and wherein the second bypass valve is a modulating valve that is set so fluid downstream from the second hot side flow path is between 33° F. and 100° F.

6. The environmental control system of claim 2, further comprising:

a water extractor upstream from the second compressor section.

7. The environmental control system of claim 2, wherein the second rotary machine further comprises:

a second turbine section including a second turbine impeller connected to the second shaft, wherein the second turbine impeller is downstream from a pressurized space in the aircraft, and wherein the second turbine impeller captures energy from pressurized air exiting the pressurized space to drive rotation of the second shaft and the second compressor impeller.

8. The environmental control system of claim 7, wherein the pressurized space in the aircraft is a passenger cabin, and wherein the second turbine section is upstream from an overboard discharge port.

9. The environmental control system of claim 2, and further comprising:

a valve controlling an amount of fuel entering the fuel burner.

10. The environmental control system of claim 9, wherein the liquid fuel moving through the cold side flow path of the heat exchanger is hydrogen, and wherein the valve is set to heat the hydrogen to a target temperature between 95° F. and 105° F.

11. The environmental control system of claim 10, wherein the target temperature is measured at an outlet of the first turbine section.

12. The environmental control system of claim 1, and further comprising:

a pump between the fuel storage tank and the heat exchanger.

13. The environmental control system of claim 1, and further comprising:

a hot conditioned air duct downstream from the first compressor to deliver hot conditioned air to the aircraft; and a cold conditioned air duct downstream from the second hot side flow path through the heat exchanger to provide cold air to the aircraft.

14. The environmental control system of claim 13, and further comprising:

a valve in the hot conditioned air duct to control an amount of the hot conditioned air delivered to the aircraft.

15. An environmental control system for an aircraft with a hydrogen fuel cell, the system comprising:

a fuel storage tank for holding liquid hydrogen fuel;

a heat exchanger comprising:

a cold side flow path through the heat exchanger downstream from the fuel storage tank, wherein the liquid hydrogen fuel is evaporated by heat generated in the environmental control system;

a first heat exchanger compartment in an upstream portion of the cold side flow path and including a first hot side flow path, wherein a fluid moving through the first hot side flow path is from a hydrogen fuel burner;

a second heat exchanger compartment directly downstream from the first section in the cold side flow path and including a second hot side flow path; and a third heat exchanger compartment directly downstream from the second section in the cold side flow path, and including a third hot side flow path;

a first rotary machine comprising:

a first compressor section upstream from the third hot side flow path through the heat exchanger, the first compressor section including a first compressor impeller;

a first shaft mechanically tied to the first compressor impeller; and a first motor connected to the first shaft to rotate the first compressor impeller;

wherein hot compressed air from the first compressor section moves through the third hot side flow path in the heat exchanger, and wherein heat from the compressed air is transferred to the hydrogen fuel in the cold side flow path of the heat exchanger; and a second rotary machine comprising:

a second compressor section downstream from the first compressor section and upstream from the second hot side flow path through the heat exchanger, the second compressor section including a second compressor impeller;

a second shaft connected to the second compressor impeller; and a second motor connected to the second shaft to rotate the second compressor impeller;

wherein hot compressed air from the second compressor section moves through the second hot side flow path in the heat exchanger, and wherein heat from the compressed air is transferred to the hydrogen fuel in the cold side flow path of the heat exchanger.

16. The environmental control system of claim 15, wherein the hydrogen fuel exits the cold side flow path through the heat exchanger as a gas, and wherein the first rotary machine further comprises:

a first turbine section including a first turbine impeller connected to the first shaft, wherein the first turbine impeller is downstream from the cold side flow path through the heat exchanger and captures energy from the gaseous hydrogen fuel to drive rotation of the first compressor section.

17. The environmental control system of claim 16, wherein the hydrogen fuel burner is downstream from a valve controlling an amount of hydrogen provided to the burner, and wherein the valve is set to heat the hydrogen moving through the cold side flow path to a target temperature between 95° F. and 105° F. at an outlet of the first turbine section.

18. The environmental control system of claim 15, wherein the hydrogen fuel burner is downstream from the cold side flow path through the heat exchanger.

19. The environmental control system of claim 15, wherein the second rotary machine further comprises:

a second turbine section including a second turbine impeller connected to the second shaft, wherein the second turbine impeller is downstream from a pressurized aircraft cabin, and wherein the second turbine impeller captures energy from pressurized air exiting the pressurized space to drive rotation of the second shaft and the second compressor impeller.

20. The environmental control system of claim 15, and further comprising:

a pump between the fuel storage tank and the heat exchanger, wherein the pump includes an electric motor.

* * * * *